US005168293A

United States Patent [19]

Ogasawara et al.

[11] Patent Number: 5,168,293

[45] Date of Patent: Dec. 1, 1992

[54] IMAGE FORMING APPARATUS

[75] Inventors: Masato Ogasawara, Tokyo; Yoshitsugu Nakatomi, Kanagawa, both of Japan

[73] Assignee: Kabushiki Kaisha Toshiba, Kawasaki, Japan

[21] Appl. No.: 736,594

[22] Filed: Jul. 26, 1991

[30] Foreign Application Priority Data

Jul. 31, 1990 [JP] Japan .................................. 2-203110

[51] Int. Cl.[5] ...................... G01D 15/14; G03G 21/00; G03G 15/14

[52] U.S. Cl. .................................... 346/160; 355/203; 355/271

[58] Field of Search ................. 346/160; 355/203, 271

[56] References Cited

U.S. PATENT DOCUMENTS 4,736,255 4/1988 Miura et al. ......................... 358/300

4,967,231 10/1990 Hosoyo et al. ................. 355/271 X 4,992,831 2/1991 Kunishi .......................... 355/273 X

*Primary Examiner*—George H. Miller, Jr.

*Attorney, Agent, or Firm*—Foley & Lardner

[57] ABSTRACT

An image forming apparatus includes an image carrying body for carrying a latent image, a developing device for applying a developing agent to the latent image to form a developing agent image on the image carrying body, a transferring device for transferring the developing agent image from the image carrying body onto a printable area of a recording medium. In the apparatus, a ratio of area of developing agent on the image carrying body to the printable area of the printing medium is detected. The developing device is controlled to apply the developing agent to the image carrying body to forcibly adhere the developing agent onto the image carrying body when the ratio is smaller than a specified ratio.

13 Claims, 12 Drawing Sheets

| OPERATION MODE | NORMAL OPERATION MODE | OPERATION MODE INCLUDING TONER FORCED CONSUMPTION MODE | | |
|---|---|---|---|---|
| CALCULATION OF PRINT FACTOR | | NOT CALCULATED | CALCULATED | |
| PRINT FACTOR CALCULATION METHOD | | — | CALCULATION PRINT DOTS OF EACH "PRINT" | |
| FREQUENCY OF EXECUTING "DUMMY PRINT" | — | AT EACH "PRINT" | EVERY TIME A "PRINT" OCCURS IN WHICH THE PRINT FACTOR IS SMALLER THAN A SPECIFIED PRINT FACTOR | |
| AMOUNT OF "DUMMY PRINT" | | ALWAYS A SPECIFIED AMOUNT | ALWAYS A SPECIFIED AMOUNT | DEPENDENT ON THE PRINT FACTOR |

<table>
<tr><td>OPERATION MODE</td><td>NORMAL OPERATION MODE</td><td colspan="3">OPERATION MODE INCLUDING TONER FORCED CONSUMPTION MODE</td></tr>
<tr><td>CALCULATION OF PRINT FACTOR</td><td rowspan="4">—</td><td>NOT CALCULATED</td><td colspan="2">CALCULATED</td></tr>
<tr><td>PRINT FACTOR CALCULATION METHOD</td><td>—</td><td colspan="2">CALCULATION PRINT DOTS OF EACH "PRINT"</td></tr>
<tr><td>FREQUENCY OF EXECUTING "DUMMY PRINT"</td><td>AT EACH "PRINT"</td><td colspan="2">EVERY TIME A "PRINT" OCCURS IN WHICH THE PRINT FACTOR IS SMALLER THAN A SPECIFIED PRINT FACTOR</td></tr>
<tr><td>AMOUNT OF "DUMMY PRINT"</td><td>ALWAYS A SPECIFIED AMOUNT</td><td>ALWAYS A SPECIFIED AMOUNT</td><td>DEPENDENT ON THE PRINT FACTOR</td></tr>
</table>

Fig.17.

IMAGE FORMING APPARATUS

BACKGROUND OF THE INVENTION

1. Field of the Invention

The present invention relates to an image forming apparatus, such as laser printers and electronic copiers, which perform image formation on recording media using developing agents.

2. Description of the Related Art

Generally, the print factor for text on recording media in image forming apparatus, such as laser printers and electronic copiers, is of the order of 5 [%]. On the other hand, the print factor in the case of printing addresses on envelopes is of the order of 0.5 [%], and this only consumes approximately 1/10 of the developing agent used when printing ordinary text.

FIG. 20 is a diagram showing the relationships between the print factor and the image density and between the percentage occurrence of white background fogging and the print factor when printing was performed by a laser printer using a two-component developing agent. From this diagram, it can be seen that, the lower the print factor, the less the image density and also the greater the white background fogging. When the cause of this was studied, there was found to be a correlation between the mean particle size of the developing agent and the percentage occurrence of white background fogging, as shown in FIG. 21. There was also found to be a correlation between the mean particle size Of the developing agent and the image density. That is, the smaller the mean particle size of the developing agent, the more the image density reduces and the more the white background fogging increases. The relationship between the print factor and the mean particle size of the developing agent is as follows. That is, the fact that the print factor is low means that the renewal of the developing agent within the developing device is poor, and thus the same developing agent stays in the developing device for a long period. Therefore, it is considered that the developing agent is repeatedly crushed by friction with the inner wall of the developing device through the rotation of the developing roller and the agitating rollers so that its particle size becomes smaller.

Moreover, in the case of a one-component developing agent, a reduction Of image density immediately appears when the print factor is reduced In other words, this is because, with a one-component developing agent, the print factor is low, any developing agent which stays on the developing roller without adhering to the photosensitive drum is repeatedly rubbed by the developing agent layer thickness regulating member and, as a result, the charge of the developing agent increases.

In this way, with prior art image forming apparatus, there was a problem in that when the consumption of developing agent was reduced due to continued image formation processing with a low print factor, the mean particle size of the developing agent gradually became smaller. This fact resulted in a reduction of image density and an increase of fogging.

U.S. Pat. No. 4,736,255 (Patented Apr. 5, 1988) shows a recording apparatus. In this recording apparatus, a developing agent image corresponding to an image infomation in accordance with data input through a data controller is formed on a photosensitive body by a laser scanner. The developing agent image is transferred to a paper, and the surface of the photosensitive body after a transfer operation is cleaned by a cleaning device. The recording apparatus comprises a developing agent applying mechanism which applies the developing agent to the surface of the photosensitive body, and which is operative when the laser scanner is not operated by a presecribed time.

However, in this recording apparatus, in order to operate the developing agent applying mechanism, this apparatus has not a calculating means to obtain a print factor expressing a ratio obtained by dividing area of developed image formed on the photosensitive body by printable area of the paper.

SUMMARY OF THE INVENTION

It is an object of the present invention to provide an image forming apparatus which is capable of inhibiting reduction of image density and increase of fogging by constantly optimising the consumption of developing agent during normal image formation processing, regardless of the print factor.

According to the present invention there is provided an image forming apparatus comprising means for applying a developing agent to a latent image formed on an image carrying body to form a developing agent image on the image carrying body, means for transferring the developing agent image from the image carrying body onto a printable area of a recording medium, means for detecting a ratio of area of developing agent image formed on the image carrying body to the printable area of the printing medium, means responsive to the detecting means for controlling the applying means to apply the developing agent to the image carrying body to forcibly adhere the developing agent onto the image carrying body when the ratio detected by the detecting means is smaller than a specified ratio, and means for removing the developing agent forcibly adhered on the image carrying body by the applying means.

BRIEF DESCRIPTION OF THE DRAWINGS

FIG. 17 is a table collating the control methods for 'dummy print';

DETAILED DESCRIPTION OF THE PREFERRED EMBODIMENT

The present invention will be described in detail with reference to the drawings.

Figure 1:
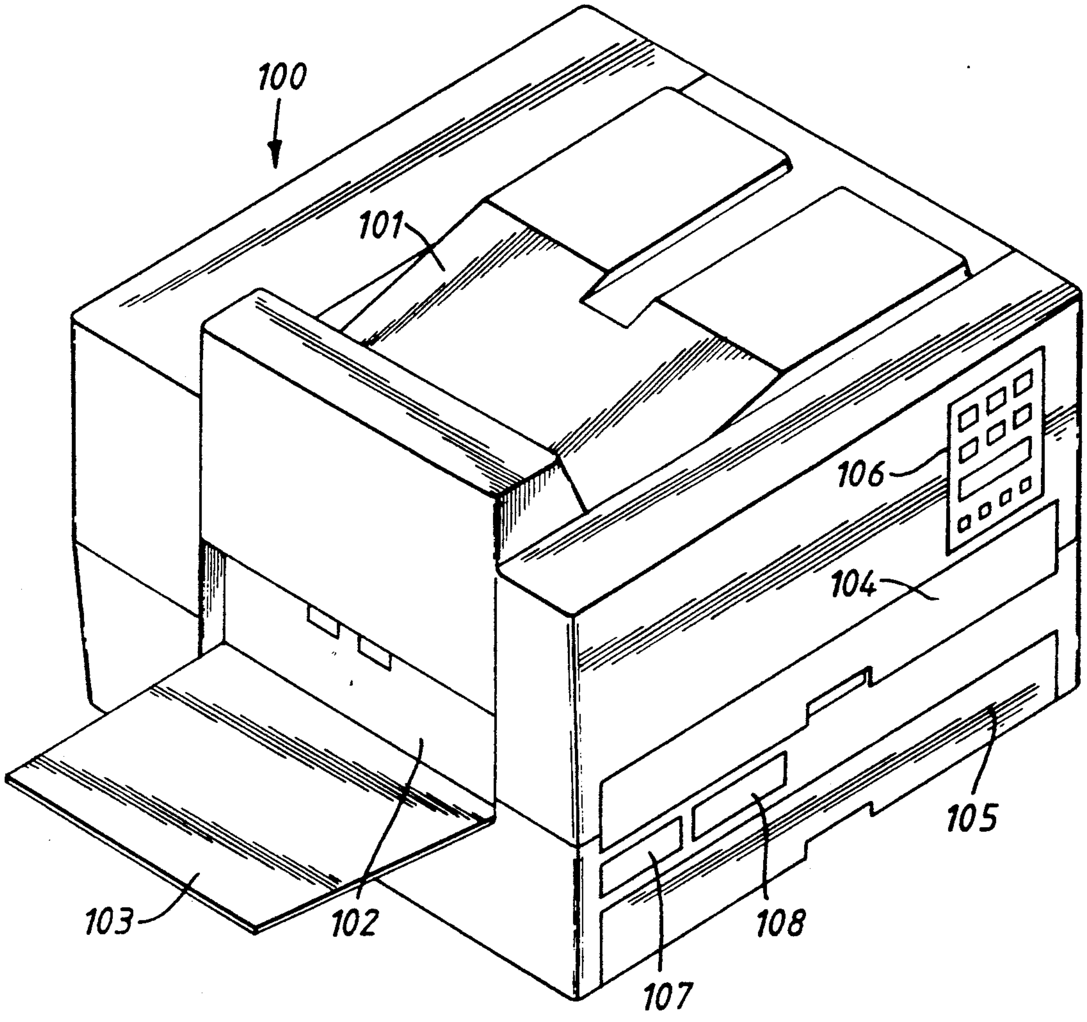
FIG. 1 is a perspective view showing the external appearance of a laser beam printer in an embodiment of the present invention.

FIG. 1 shows an external appearance of a laser beam printer as an image forming apparatus of an embodiment of the present invention.

In FIG. 1, in the top surface of main body 100, concave part 101, which is the first paper dispense unit in which paper is stored after printing, is formed. Also, opening 102, which is the second paper dispense unit into which paper is dispensed after printing, is provided in one side of main body 100. The paper dispensed from opening 102 is designed to be positioned on paper receiving tray 103 which is detachabel from main body 100. Paper cassettes 104 and 105 are housed in the lower part of main body 100 so that they can be installed or removed. Reference numeral 106 denotes a operating panel for performing the various operations of this laser beam printer. Reference numerals 107 and 108 denote openings for the insertion and removal of various IC cards, such as font cards and applications cards for additional functions.

Figure 2:
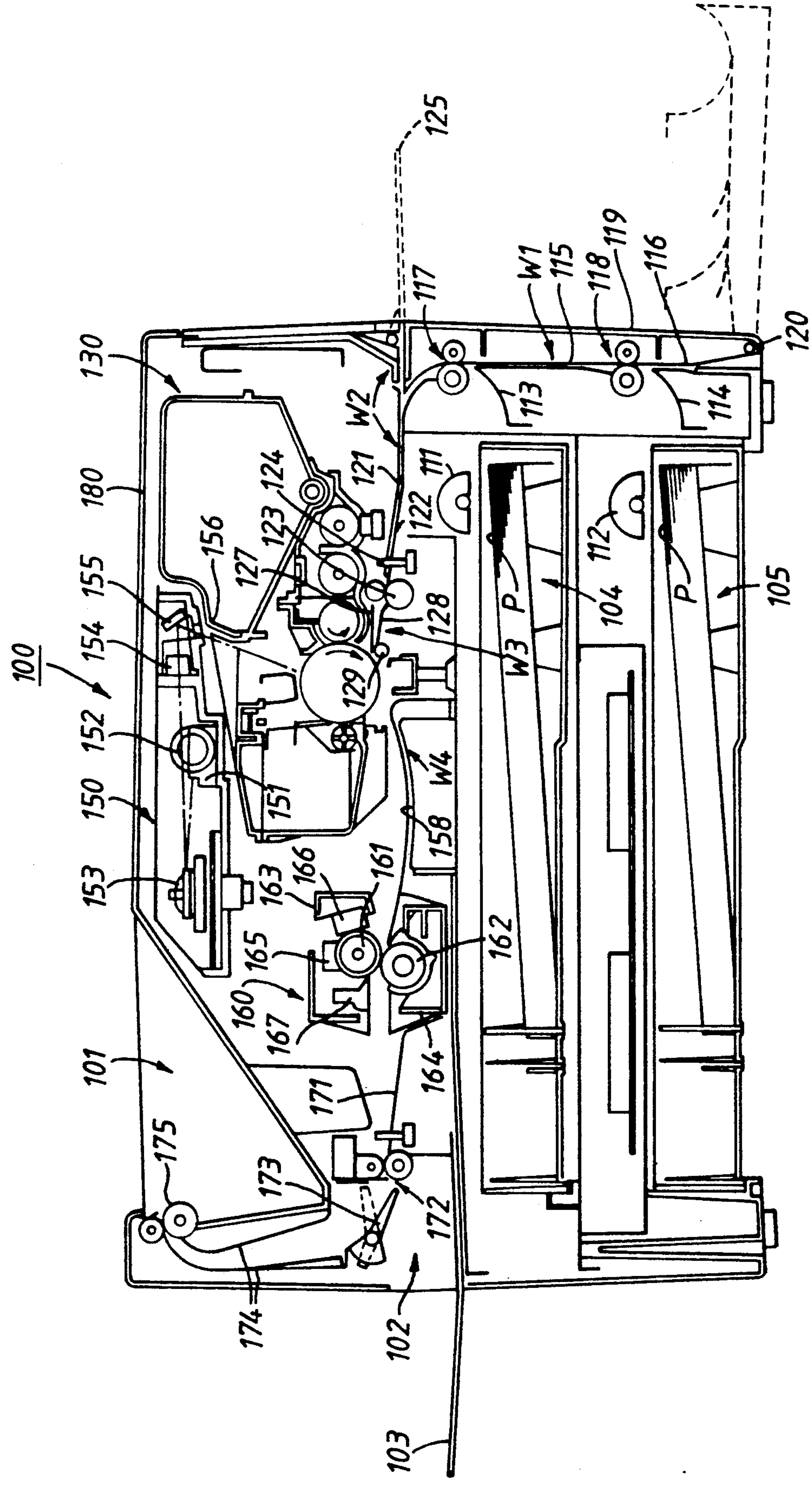
FIG. 2 is a cross-section of the laser beam printer in FIG. 1.

FIG. 2 is a cross-section of the laser beam printer shown in FIG. 1.

As shown in FIG. 1, paper supply rollers 111 and 112 are respectively positioned in the vicinity of paper cassettes 104 and 105 housed in main body 100 for supplying paper P, which is the recording medium and is stored in paper cassettes 104 and 105, to first paper transport path W1 by successively extracting the topmost paper. Paper transport path W1 comprises paper transport guides 113–116 and two paper transport roller pairs 117 and 118. Each of paper transport guides 113–116 is incorporated with side cover 119, which can be opened and closed in main body 100 about spindle 120. Second paper transport path W2 is positioned at the downstream end of first paper transport path W1 to transport paper P toward the image transferring station. Second paper transport path W2 comprises paper transport guides 121 and 122 and aligning roller pair 123. Aligning switch 124 is positioned on the upstream side of aligning roller pair 123 to detect the passage of paper P. Moreover, manually inserted paper transport path W2' which merges with second paper transport path W2 is arranged on the part positioned above side cover 119 of main body 100. Manually inserted guide 125 is arranged ar the side of main body 100 to lead paper P to transport path W2' for the manual supply of paper P.

Third paper transport path W3 is formed on the downstream side of aligning roller pair 123 for finally guiding paper P to the image transferring station. Third paper transport path W3 comprises a pair of upper and lower paper transport guides 127 and 128 and transferring guide roller 129.

Figure 3:
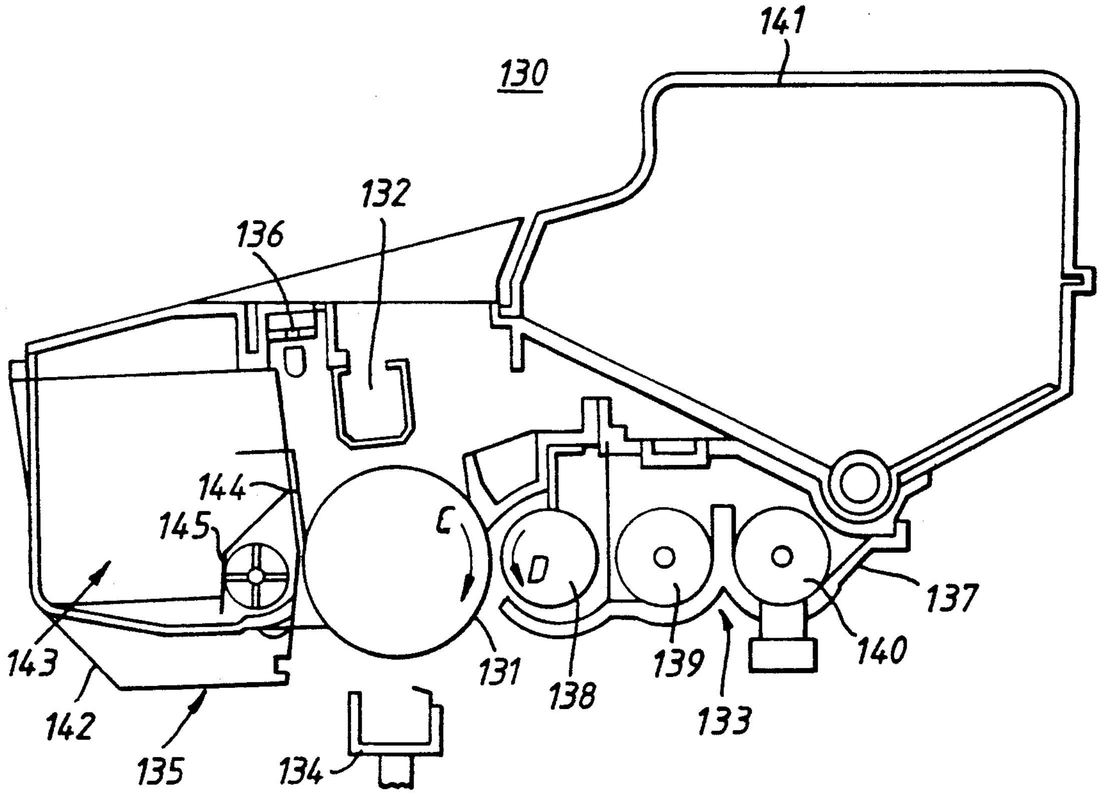
FIG. 3 is a cross-section showing an electrophotographic process unit in the laser beam printer shown in FIG. 2.

FIG. 3 shows an enlargement of electrophotographic process unit 130.

As shown in FIG. 3, electrophotographic process unit 130 is composed by positioning main charger 132, developing device 133, transferring device 134, cleaning device 135 and discharge lamp 136 around the periphery of photosensitive drum 131, which is the image carrier, sequentially in the direction of rotation shown by arrow C. Main charger 132, composed of a scorotron, uniformly charges the surface of photosensitive drum 131. Developing device 133 develops the electrostatic latent image formed on the surface of photosensitive drum 131 using a two-component developing agent comprising a toner and a carrier particles. Transferring device 184 acts to transfer the toner adhering to the surface of photosensitive drum 131 onto paper P. Cleaning device 135 as a developing agent removal device removes any toner remaining on the surface of photosensitive drum 131 after transferring operation by transferring device 134. Discharge lamp 136 acts to eliminate chargees remaining on photosensitive drum 131.

Developing device 133 is composed by positioning developing roller 138, which has a magnet inside it, and two augers 139 and 140, which agitate the developing agent, inside developer case 137. Toner replenishment unit 141 is installed in developing device 133 for resupplying any toner which has been consumed.

Cleaning device 135 is formed by arranging toner storage unit 143, elastic blade 144 and toner transport roller 145 inside cleaner case 142. The toner removed from photosensitive drum 131 is stored in toner storage unit 143. Elastic blade 144 makes contact with the surface of photosensitive drum 131 and scrapes off any remaining toner adhering to photosensitive drum 131. Toner transport roller 145 transports the scraped-off toner to toner storage unit 143.

Returning to FIG. 2, laser exposure unit 150 is composed of case 151, condenser lens unit 152, polarising unit 153, Fθ lens 154, reflecting mirror 155 and dust-tight glass 156. Case 151 houses a laser diode (not shown). Condenser lens unit 152 condenses the laser beam of the laser diode. Polarising unit 153 polarises the laser beam from condenser lens unit 152.

Paper transport guide 158, which forms fourth paper transport path W4, leads paper P, which has passed through the image transferring station between photosensitive drum 131 and transferring device 134, to fixing unit 160.

Fixing unit 160 comprises heat roller 161 and pressure roller 162 which is in press contact with heat roller 161. Heat roller 161 and pressure roller 162 are respectively enclosed by upper casing 163 and lower casing 164. The design is to guarantee the ambient temperature required for fixing the toner image on paper P by this means. Around the periphery of heat roller 161, cleaner 165, thermister 166 and paper peeling guide 167 are arranged. Cleaner 165 cleans the surface of heat roller 161. Thermister 166 detects the surface temperature of heat roller 161. Paper peeling guide 167 correctly peels the edge of paper P, which has completed fusion fixing, from heat roller 161.

On the downstream side of fixing unit 160, paper dispense guide 171 first paper dispense roller pair 172, gate unit 173, paper dispense guide pair 174 and second paper dispense roller pair 175 are sequntially arranged. Gate unit 173 switches the dispense destination of paper P to either the first paper dispense unit (concave part 101) or the second paper dispense unit (opening 102).

Figure 4:
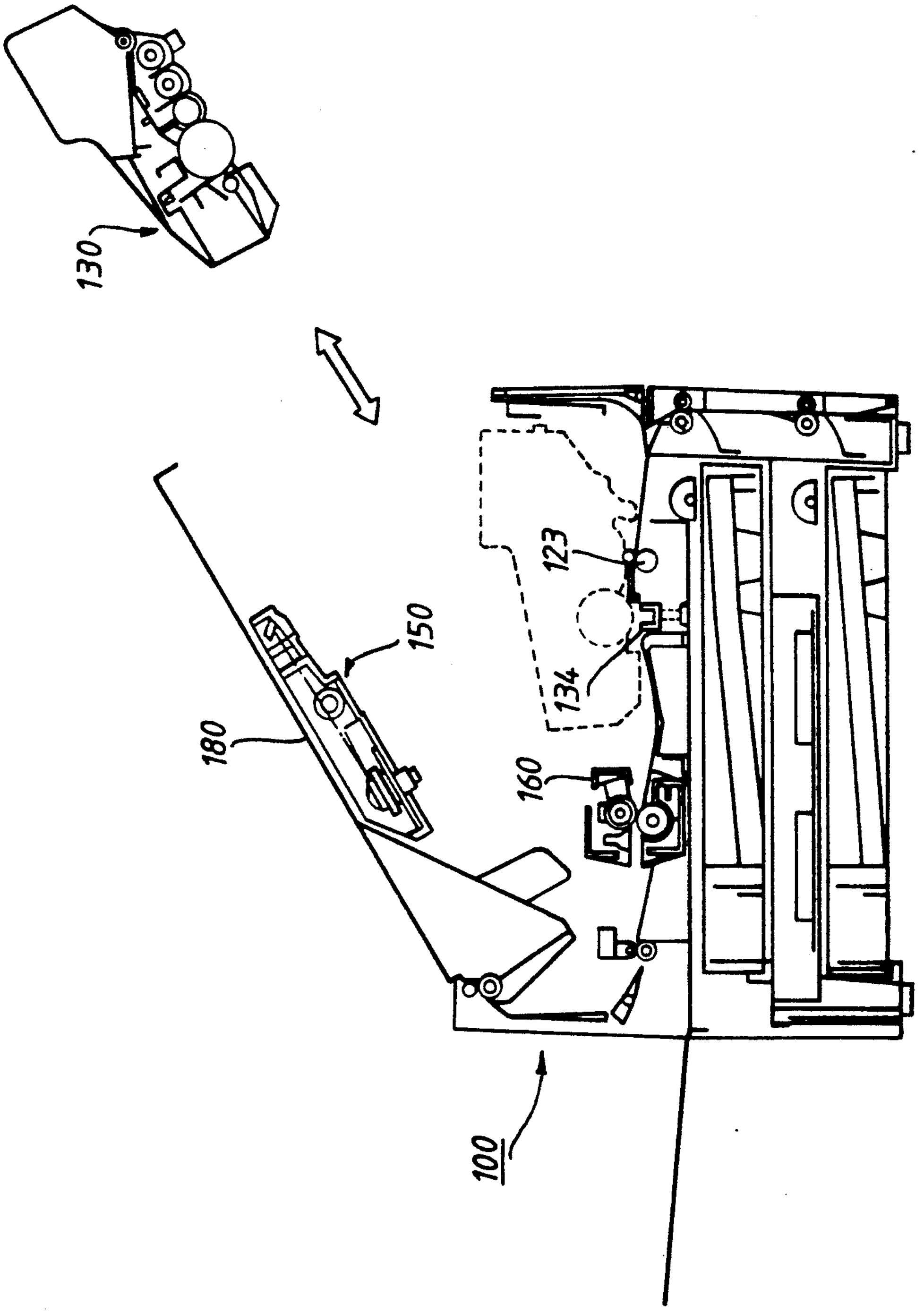
FIG. 4 is a cross-section showing the state when the electrophotographic process unit shown in FIG. 3 is withdrawn from the main body.

In a laser beam printer with the above construction, each component of electrophotographic process unit 130, with the exception of transferring device 134, is incorporated as shown in FIG. 4, and can be installed in or removed from main body 100. That is, top cover 180, which can be opened and closed, is provided in the top surface of main body 100. Laser exposure unit 150 is secured to the inner surface of top cover 180. Top cover 180 is designed to be capable of rotating upwards to a maximum of approximately 60° about a spindle at one end.

The operation of this embodiment will now be described.

The surface potential of photosensitive drum 131 becomes approximately −700 [V] by the action of main charger 132. Then, a laser beam from laser exposure unit 150 is selectively irradiated on the surface of photosensitive drum 131 based on image information. As a result, the potential of part of the surface of photosensitive drum 131 becomes approximately −100 [V], and an electrostatic latent image is formed.

At the same time, a bias voltage of approximately −500 [V] is applied to developing roller 138 in developing device 133. When photosensitive drum 131, which is carrying the electrostatic latent image, comes into contact with developing roller 138, the toner adhering to developing roller 138 by magnetism will adhere to the laser-irradiated portion of the surface of photosensitive drum 131 due to the voltage difference of approximately 400 [V] between photosensitive drum 131 and developing roller 138. As a result, the electrostatic latent image on the surface of photosensitive drum 131 is rendered visible by becoming a toner image.

After this, the toner image on the surface of photosensitive drum 131 is transferred onto paper P, which is conveyed between photosensitive drum 131 and transferring device 134. Then, paper P on which the toner image is adhered to fixing unit 160, and the toner image fixed on paper P.

Any toner remaining on photosensitive drum 131 without transferring onto paper P is scraped off by elastic blade 144 of cleaning device 135 and is collected inside toner storage unit 143.

After this, the surface potential of photosensitive drum 131 is rendered uniform by tungsten light from discharge lamp 136 and is thus prepared for the next 'print' cycle.

The laser beam printer of this embodiment has, as one of its operating modes, a developing agent forced consumption mode for the forced consumption of the developing agent in developing device 133. Hereafter, the series of operations in this operating mode is called 'dummy print'.

In this 'dummy print' the basic operation is that a set pattern electrostatic latent image is formed on the surface of photosensitive drum 131 and is rendered visible by developing device 133. Then, all the developing agent adhering to the surface of photosensitive drum 131 is removed by cleaning device 135 without transferring any of the developing agent onto paper P.

A practical process timing for 'dummy print' will now be described.

'Dummy print' can be carried out during the 'warming-up' of the laser beam printer and during 'stand by'. 'Dummy print' can also be carried out during the normal print' operation.

Figure 5:
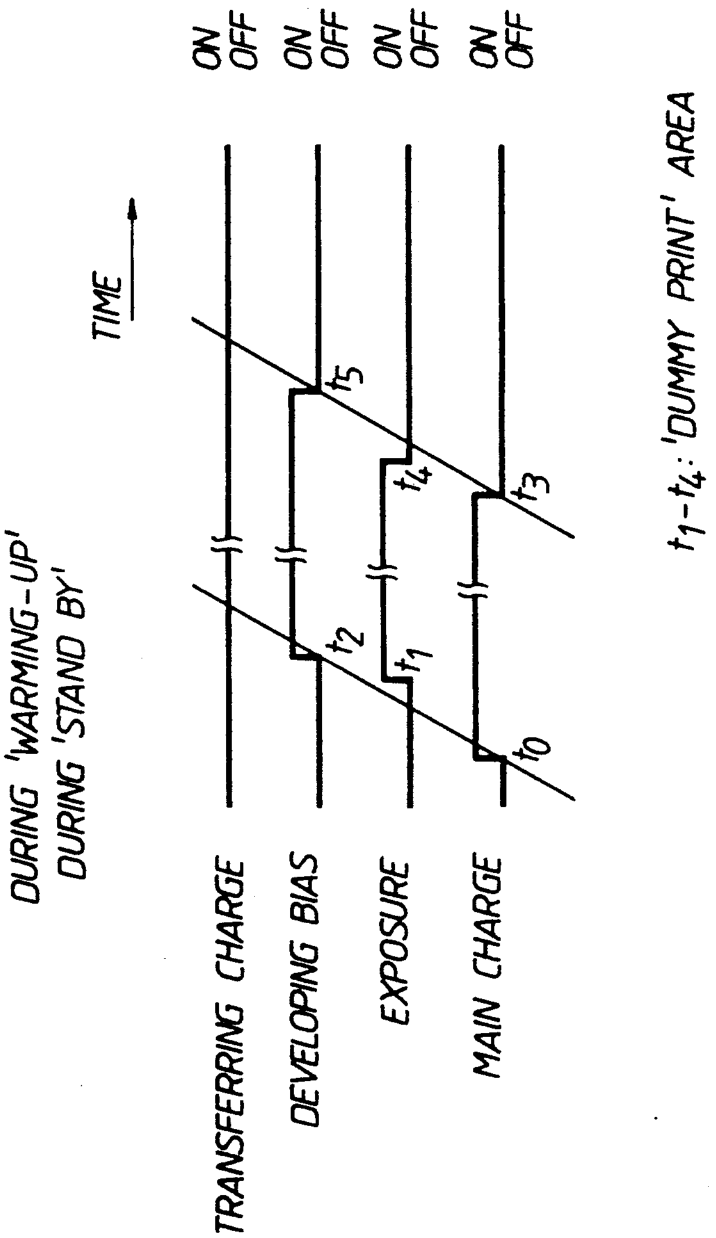
FIGS. 5 and 6 are timing charts showing practical process timings for 'dummy print'.
Figure 6:
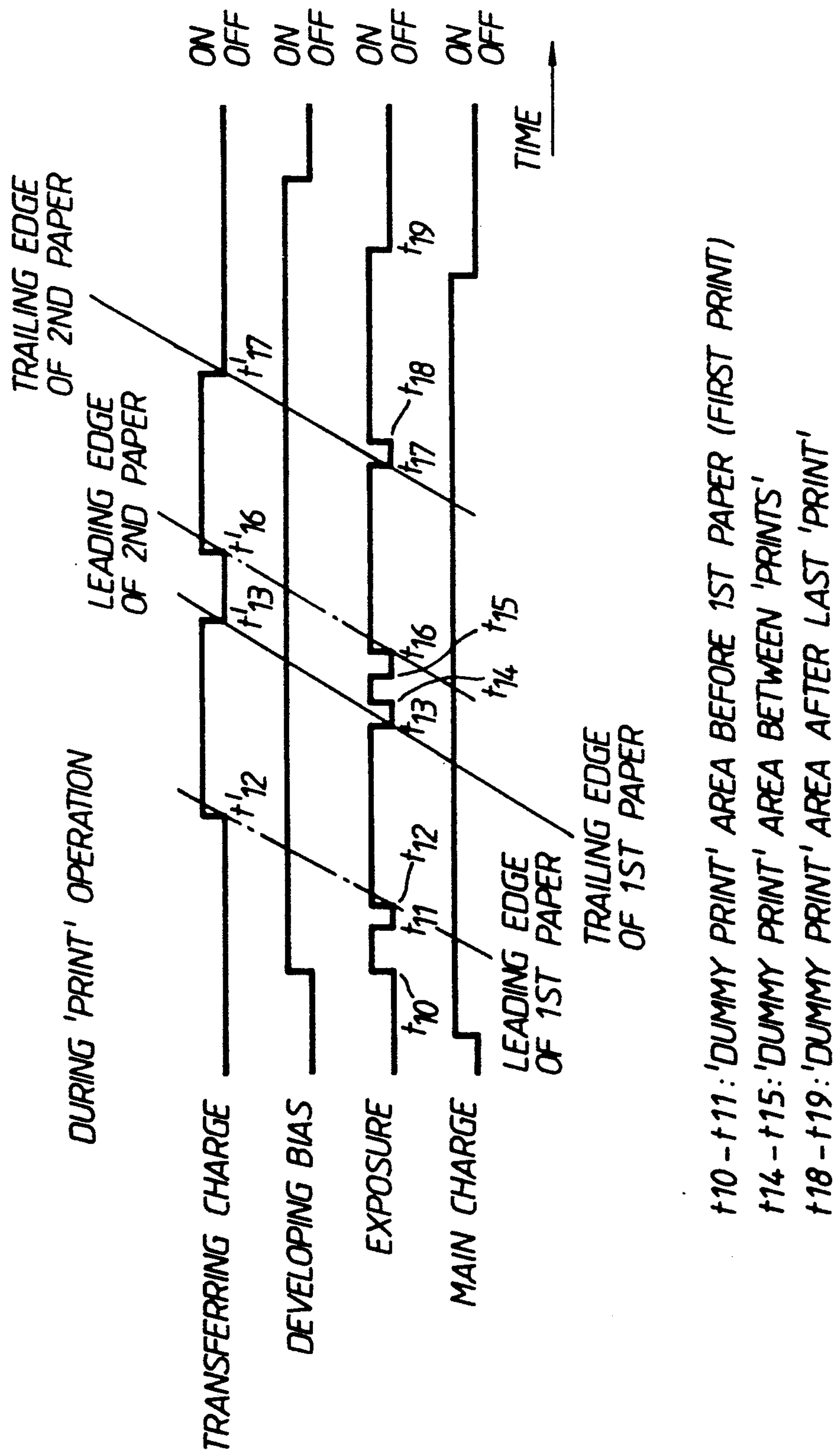

FIG. 5 shows a timing chart for the case of carrying out 'dummy print' during the 'warming-up' or 'stand by' of the laser beam printer. FIG. 6 shows a timing chart for the case of executing 'dummy print' in between normal 'print' operations.

Figure 7:
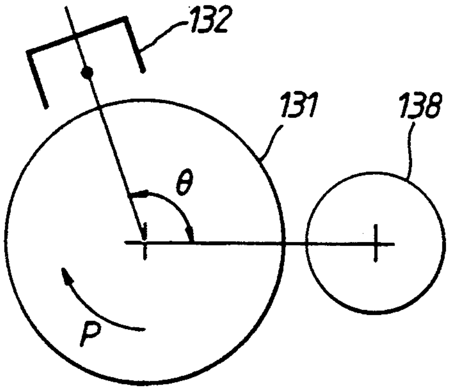
FIG. 7 is a drawing showing the positional relationships between a photosensitive drum and a main charger and a developing roller shown in FIG. 3.
Figure 8:
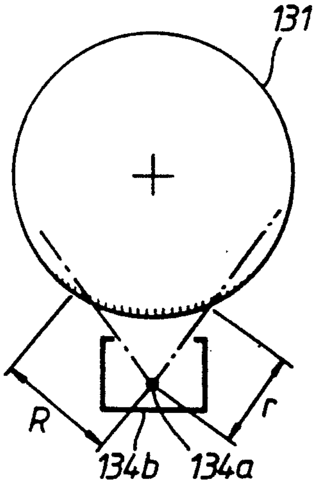
FIG. 8 is a drawing showing the positional relationship between the photosensitive drum and a transfer charger shown in FIG. 3.

In the cases of carrying out 'dummy print' during the 'warming-up' or 'stand by', the operation of transferring device 134 remains switched OFF. In this case, the following points must be taken into consideration As shown in FIG. 7, when taking the diameter of photosensitive drum 131 as 2r [mm], the angle between the positions of main charger 132 and developing roller 138 as $\theta°$ and the peripheral speed of photosensitive drum 131 as P mm/sec, it is virtually necessary to establish the relationship $$t2-t0=t5-t3=(2\pi r\times\theta/360)/P$$

between the charge rising time to and the falling time t3 and between the developing bias rising time t2 and the falling time t5 respectively. That is, in the case of t2-t0$>(2\pi r\times\theta/360)$ / P, there is a risk of occurrence of the carrier particles adhering to photosensitive drum 131. Conversely, in the case of t2−t0$<(2\pi r\times\theta/360)$ / P, there is a risk of occurrence of unnecessary toner adhering to photosensitive drum 131.

As shown in FIG. 6, 'dummy print' during normal 'print' operation is performed before 'first print', between each 'print' and after 'last print' In FIG. 6, t10–t11, t14–t15 and t18–t19 are exposure available timings for 'dummy print'. In this case, ON/OFF switching control is carried out so that transferring device 134 is switched ON only when paper P passes over transferring device 134, and transferring onto paper P is not performed for the developing agent adhering to the surface of photosensitive drum 131 as the 'dummy print'.

In this connection, since the toner on photosensitive drum 131 carries a charge of negative polarity, if a portion on photosensitive drum 131 to which toner is adhering is caused to approach transferring device 134 without paper P having passed in between, the toner will be attracted by the wire in transferring device 134, on which a positive polarity of approximately 5 KV is applied, and the wire will become soiled. Also, normally, in the case of a corona discharge being generated from a wire by applying a high voltage the corona is discharged in a radial state centred on the wire. However if, as in this embodiment, there are the case of transferring device 134 and photosensitive drum 131 in the vicinity of the wire, the corona is discharged from wire 134*a* in a bow shape, and the corona takes in that surface of photosensitive drum 131 which is positioned outside case 134*b* of transferring device 134.

Under such circumstances, in the action of transferring device 134 when 'dummy print' is carried out, the points at which the extensions of the straight lines between wire 134*a* and the ends of the opening of case 134*b* of transferring device 134 intersect the surface of photosensitive drum 131 are taken as the attainable points for transferring. If the distances between wire 134*a* and these attainable points for transferring are taken as r, and the distance between the end of the portion to which toner is adhering on photosensitive drum 131 and wire 134*a* is taken as R, it is necessary to stop the action of transferring device 134 within limits which satisfy the relationship $R<1.2r$.

The 'dummy print' pattern will now be described.

Figure 9:
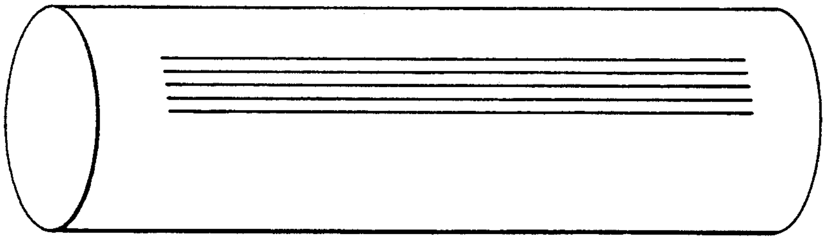
FIGS. 9 to 13 are respectively perspective views and cross-sections of the photosensitive drum to illustrate unsuitable patterns for 'dummy print' and the reasons why they are unsuitable.
Figure 10:
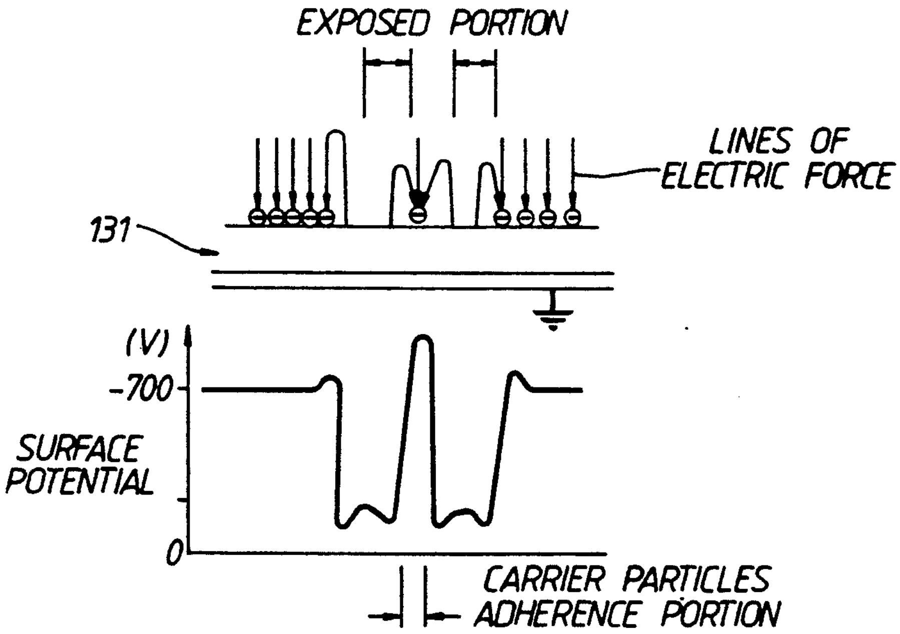

The 'dummy print' pattern must be one in which it is difficult for the adherence of the carrier particles to photosensitive drum 131 to occur. If carrier particles are present on photosensitive drum 131, photosensitive drum 131 will be damaged when cleaning is performed by elastic blade 144 of cleaning device 135, since the carrier particles will be rubbed against the surface of photosensitive drum 131. For this reason, patterns with lines which are too fine, such as for instance "a 1-dot line every 2nd dot" and "a 2-dot line every 3rd dot", as shown in FIG. 9, should be avoided. This is because, as shown in FIG. 10, in this case the surface potential of the unexposed portions in the pattern on photosensitive drum 131 become high due to the edge effect, so that the carrier particles are liable to adhere to these portions.

Figure 11:
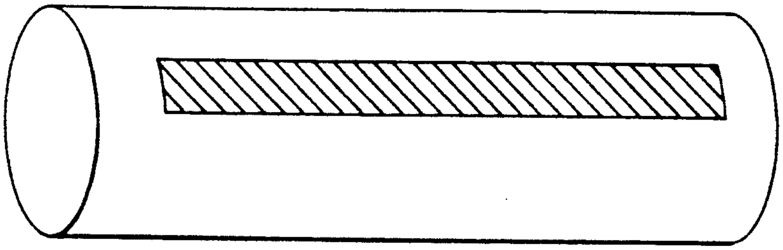
Figure 12:
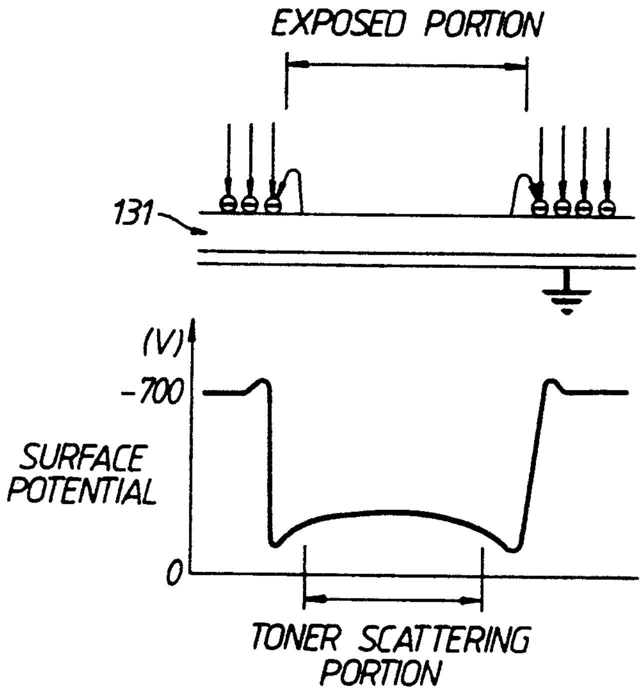

Also, the 'dummy print' pattern must be one in which it is difficult for toner scattering to occur. For this reason, as shown in FIG. 11, coarse patterns such as, for instance, all-over black images should be avoided. That is, in this case, as shown in FIG. 12, the adsorption of the toner to the surface of photosensitive drum 131 becomes weaker in the central part of the pattern, and toner scattering is liable to occur in this portion.

Figure 13:
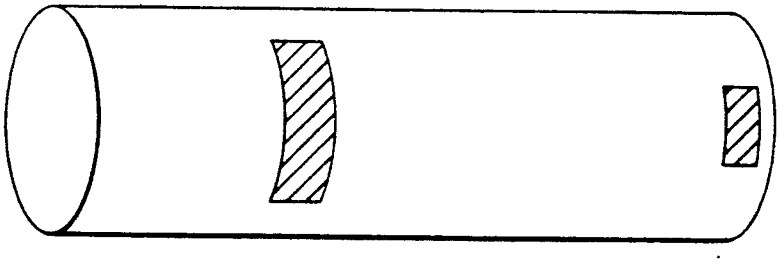

Moreover, the 'dummy print' pattern must be one in which it is difficult for poor cleaning to occur. For instance, as shown in FIG. 9, for a fine pattern such as "a 1-dot line every 2nd dot". the adsorption between photosensitive drum 131 and the toner becomes too strong because the edge effect is partially emphasised. Thus, there are cases when elastic blade 144 does not completely remove the toner. Also, when the 'dummy print' pattern is concentrated locally and 'dummy print' patterns are provided at the ends of photosensitive drum 131, as shown in FIG. 13, there is a risk of the occurrence of a state in which part of the toner scraped off by elastic blade 144 falls off outside without being collected by toner storage unit 143.

Figure 14:
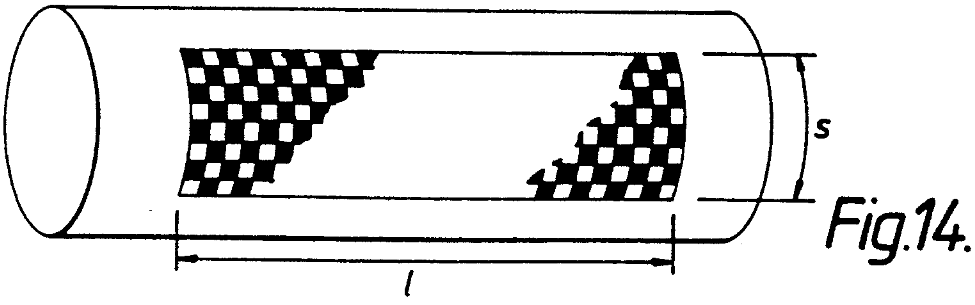
FIG. 14 is a perspective view of the photosensitive drum to illustrate a suitable pattern for 'dummy print'.

From the above points, the ideal 'dummy print' pattern is one which has a uniform amount of toner in the longitudial direction at a position which excludes the ends of photosensitive drum 131, and can obtain a suitable edge effect. For instance, as shown in FIG. 14, it is preferable uniformly to print a black and white checker pattern based on a square with a side of approximately 3 [mm], omitting portions of width about 20 [mm] at the two ends of photosensitive drum 131. The amount of toner consumed in the 'dummy print' can be adjusted by the printed surface area of the checker pattern 'dummy print' pattern, in other words by the length S in the peripheral direction and the length l in the longitudinal direction of photosensitive drum 131. However, the length S must be selected within limits such that, as mentioned above, the toner is not attracted to transferring device 134. Also, the length l must be selected within limits such that the 'dummy print' pattern is deparated from each end of photosensitive drum 131 by 20 [mm] or more, and preferably 50 [mm] or more. Moreover, for the length of side of the squares in the checker pattern, if the resolution of the laser beam printer is 300 [dots/inch] a length within the limits of approximately 0.3–5 [mm] is desirable. That is, with a length of side of the squares in the checker pattern of 0.25 [mm] or less, adherence of the carrier particles to photosensitive drum 131 is liable to occur due to local emphasis of the edge effect, while if it exceeds 5 [mm] toner scattering is liable to occur. In this embodiment, the width was made 206 [mm] (the maximum printable width for letter size paper) in the longitudinal direction of photosensitive drum 131, and one side of the squares of the checker pattern was made 0.42 [mm] (the length of 5 dots).

The laser beam printer of this embodiment carried out the following type of control of 'dummy print' based on the print factor for the recording medium. The following is a description of this 'dummy print' control method.

Figure 15:
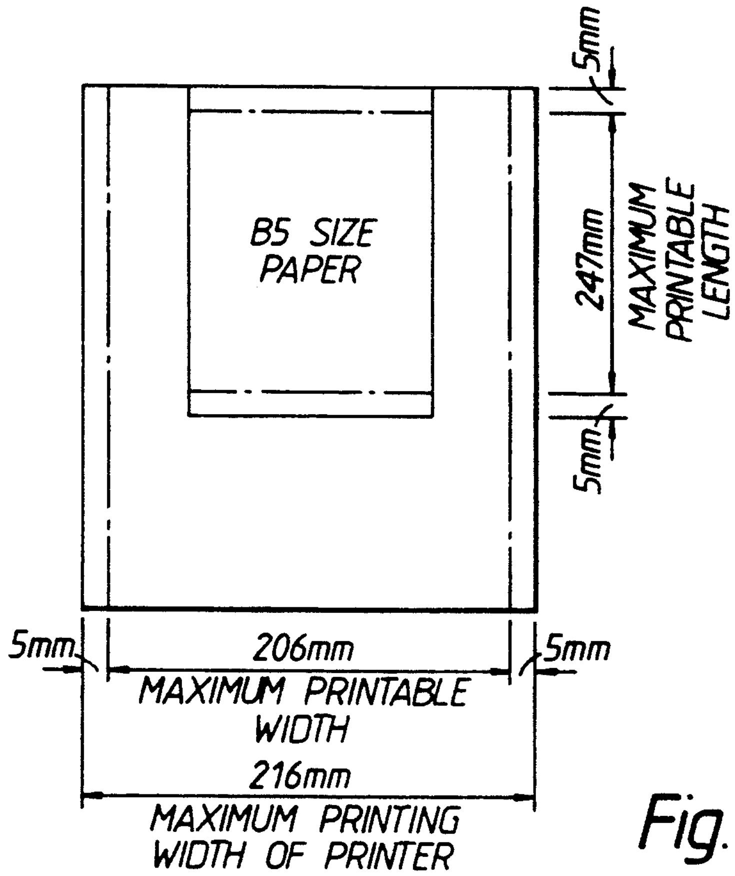
FIG. 15 is a drawing to illustrate the calculation method for the number of printable dots required for the calculation of the print factor.

Here, taking the number of printable dots in the area $(W \times L)$ formed by the maximum printable width W of the laser beam printer and the length L of the paper as $D_{ALL}$ and the number of emissions of the laser beam as D, the print factor is expressed as $D/D_{ALL}$. Here, the number of emissions of the laser beam is obtained by counting the number of video data "o" transmitted to the laser diode based on the image information. Also, the length L of the paper for obtaining $D_{ALL}$ can be calculated from the time after aligning switch 124 has been once switched ON to its switching OFF. That is, when taking the time of continuous detection of the passage of the paper by aligning switch 124 as t [sec] and the transport speed of the paper as V [mm/sec], the length L [mm] of the paper is calculated by $t \times v$. Moreover, $D_{ALL}$ can be obtained from the length L of the paper by the following method. For instance, as shown in FIG. 15, in the case of B5 size paper, the maximum printable width (letter size) is 216 [mm]. However, the actual maximum width is 206 [mm], since, for the reason stated above, the 'dummy print' must avoid 5 [mm] at each side. Also, in this laser beam printer, since 300 [dots]can be printed in a width of 1 [inch], it is possible to print a total of 2,433 [dots] in the maximum printable width Of 206 [mm]. Moreover, although the length of B5 size paper is 257 [mm], since it is necessary to avoid 'dummy print' for the 5 [mm] at each of the upper and lower ends. The maximum printable length is 247 [mm]. Therefore, the printing of a total of 2,917 [dots] can be executed in the vertical direction of B5 size paper. For this reason, the $D_{ALL}$ of B5 size paper can be obtained as $2{,}433 \times 2{,}917 = 7{,}097{,}061$ [dots].

'Dummy print' control based on the print factor obtained by dividing this $D_{ALL}$ by D (the number of emissions of the laser beam) is executed as follows.

Figure 16:
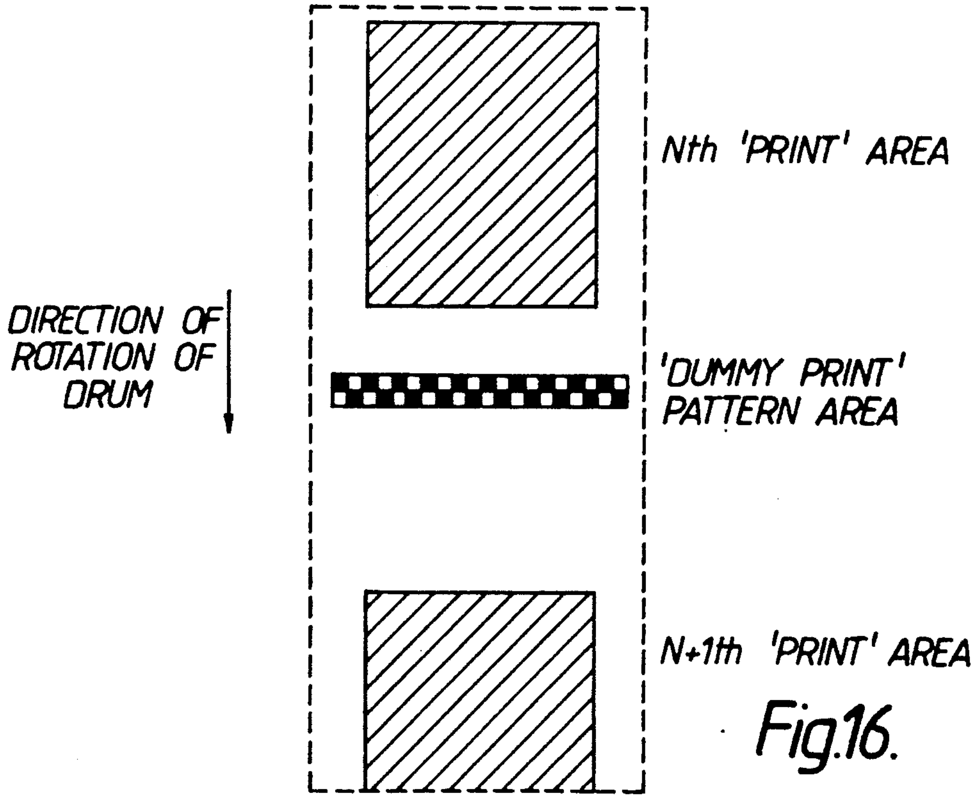
FIG. 16 is a development of the surface of the photosensitive drum carrying a 'dummy print' pattern.

In the case of the print factor resulting from printing on a certain paper being less than the normal print factor, for instance being 2 [%] or less, as shown in FIG. 16, 'dummy print' is executed immediately after that 'print' operation (between the 'print' operation for which the print factor was 2 [%] or less and the next 'print' operation). That is, the 'dummy print' is excuted after that the toner image formed on the surface of photosensitive drum 131 is transferred onto paper P by transferring device 134. FIG. 16 is a development of the patterns on photosensitive drum 131. Also, if the 'print' with a print factor of 2 [%] is the last in a series of 'prints'. the 'dummy print' is executed on completion of that last 'print' and after this the 'print' operation is taken down.

Moreover, in this embodiment, 'dummy print' is controlled so that the total of the amount of toner consumed by the normal image forming process and the amount of toner consumed by 'dummy print' is made equivalent to the normal print factor, for instance 5 [%].

For instance, in the case of 'print' being executed with a print factor of 1 [%] on A4 size paper, the maximum printable width is 206 [mm] and from this the number of printable dots in the transverse direction of the paper is 2,433 [dots] and the number of printable dots in the longitudinal direction of the paper is 3,398 [dots]. Therefore, $D_{ALL}$ is $2,433 \times 3,398 = 8,245,437$ [dots]. On the other hand, when the pattern is composed of squares with side of 5 [dots], the number of dots included in 1 line of the checker pattern is 6.082 [dots]. Thus, if a 4 [%] portion of dummy print is executed, the number of dots in the whole 4 [%] portion is 329,817 [dots]. Since 329,817/6,082 is 54.2, 'dummy print' may be carried out with the checker pattern. If the threshold value of the print factor in this case is within 5 [%], any [%]may be used.

The design of the laser beam printer in this embodiment is such that the operation mode in which the forced consumption mode which executes the above 'dummy print' is included and the normal operation mode which does not execute 'dummy print' are provided separately, and the user is able to select either operation mode at his discretion. This selection operation can be executed either on operating panel 106 or by the command from a host. By this means, the shortening of the exchange cycle of electrophotographic process unit 130 due to forced consumption of toner can be controlled.

FIG. 17 is a table collating the above 'dummy print' control methods.

By using the laser beam printer of this embodiment in this way, the renewal of the toner in developing device 133 can be activated by causing its consumption at an optimal pace by executing 'dummy print' in a toner forced consumption mode, even if a 'print' operation with a low print factor is continued. By this means, it is possible to inhibit reduction of image density and increase of fogging.

Another embodiment of the present invention will now be described.

Figure 18:
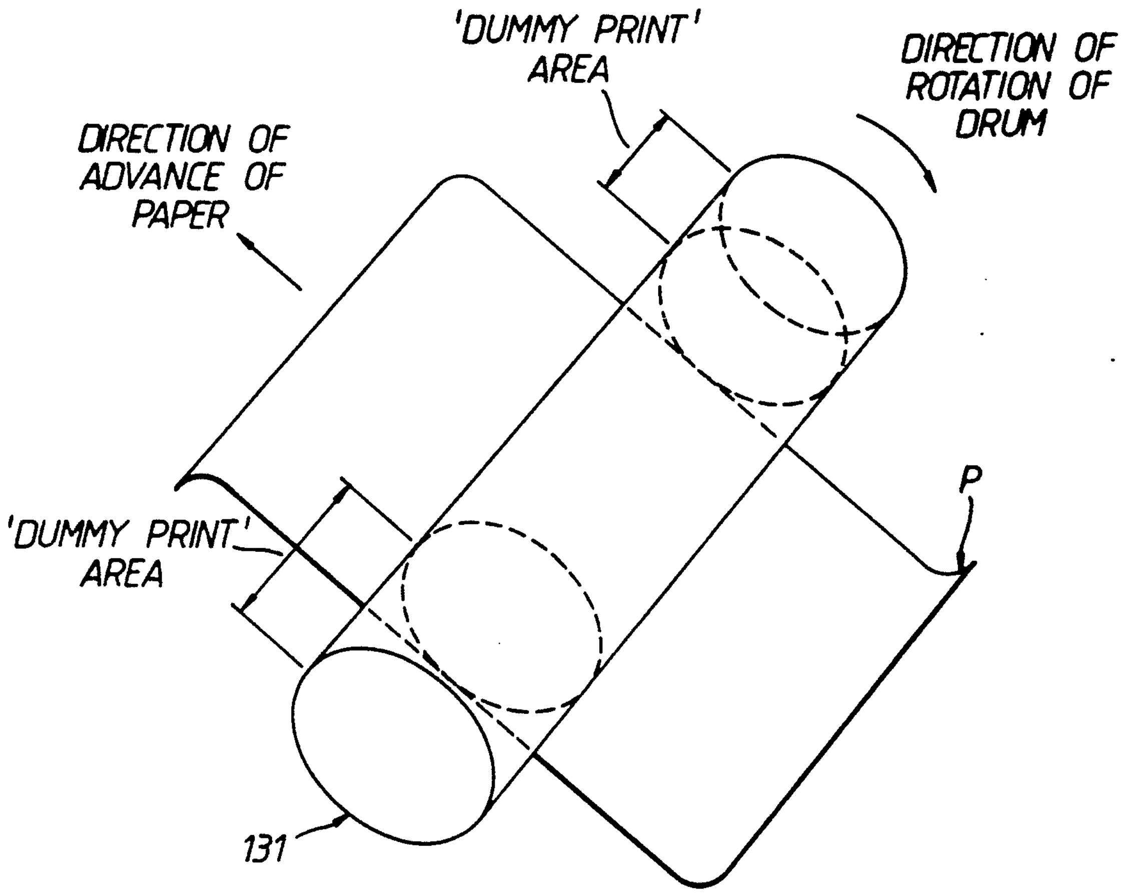
FIG. 18 is a perspective view to illustrate another embodiment Of the present invention.

In the previous embodiment, the design is to form a uniform pattern made of a checker pattern in the longitudinal direction of photosensitive drum 131 as the 'dummy print' pattern. However, as shown in FIG. 18, as an alternative method, 'dummy print' may be executed around the periphery of photosensitive drum 131 excluding the position which corresponds to the outline of paper P.

In the case of this method, by limiting the toner image transferring area in the longitudinal direction of photosensitive drum 131, which matches the width of paper P, and by causing the peripheral portion of photosensitive drum 131 on which the 'dummy print' pattern is formed to be outside the area of the toner image transferring process, complex ON/OFF control of the transferring device is not required.

Also, in the case of this method, by obtaining the print factor through timing the laser beam ON time every 1 scan of the laser beam on photosensitive drum 131, it is possible to exercise 'dummy print' control in 1-scan units.

Figure 19:
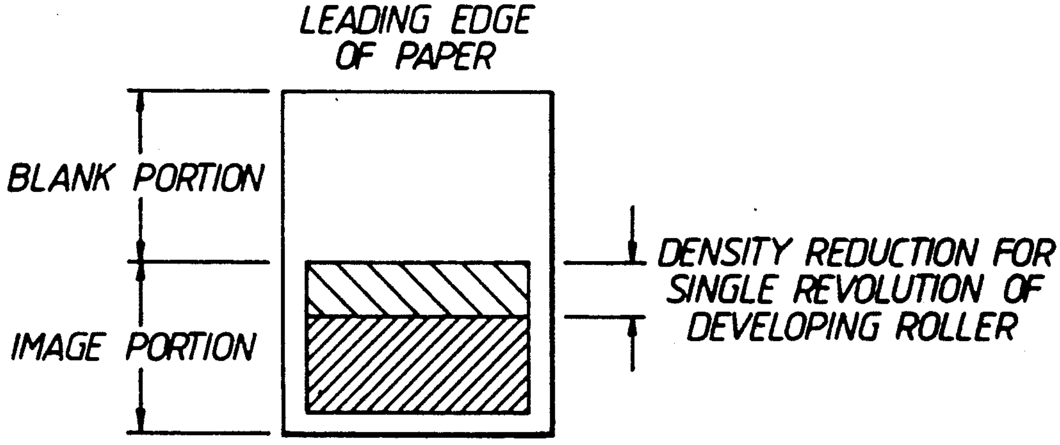
FIG. 19 is a drawings to illustrate the effect Of the embodiment shown in FIG. 18.
Figure 20:
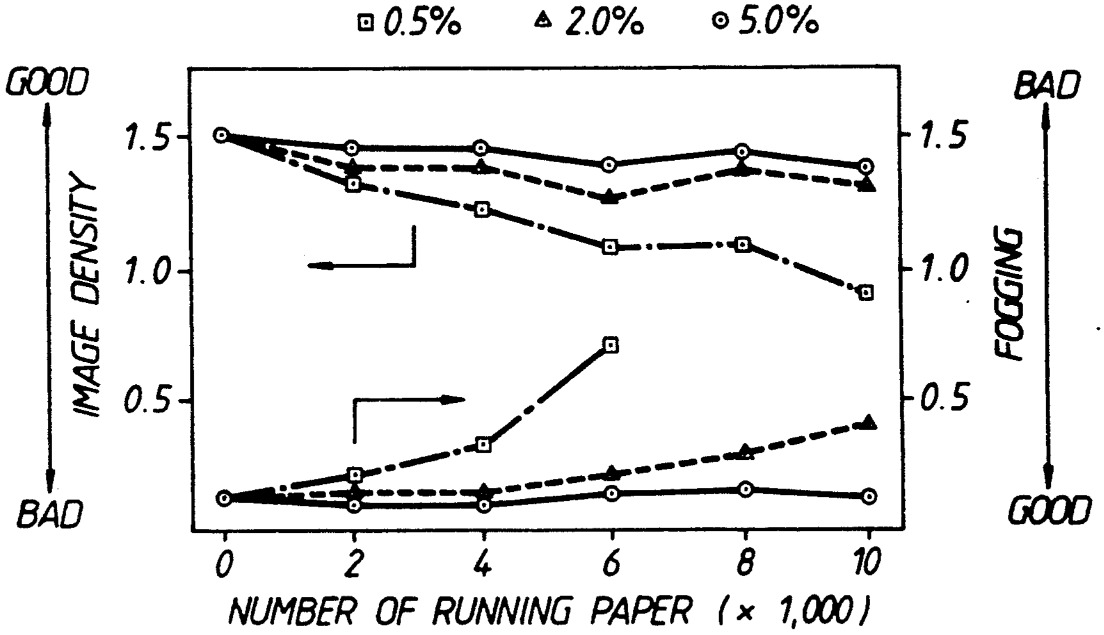
FIG. 20 is a drawing showing the relationship between the print factor in a laser beam printer using a two-component developing agent and image density and the occurrence of image white ground fogging.
Figure 21:
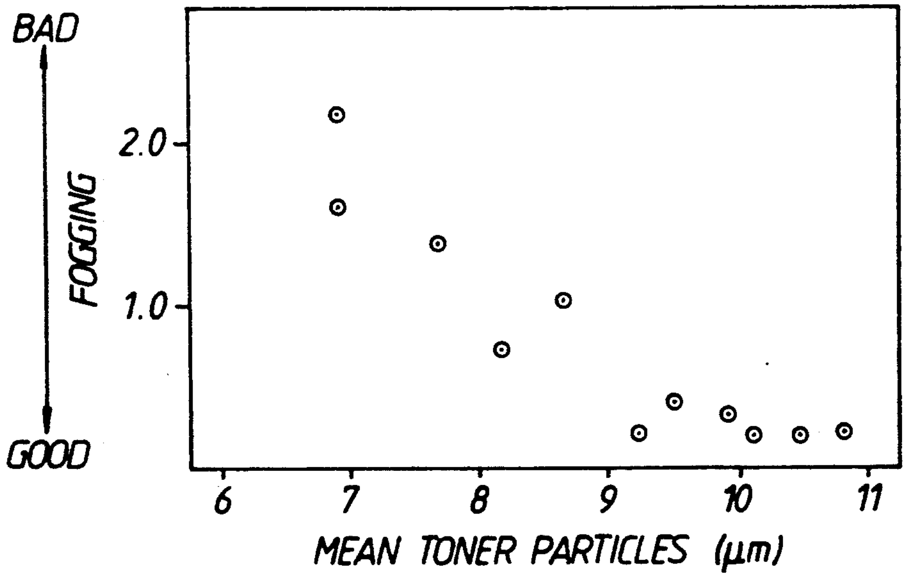
FIG. 21 is a drawing showing the correlation between the mean particle size of the developing agent and the occurrence of white ground fogging.

The following is a description of the effectiveness of this embodiment with reference to FIG. 19. For instance, in the case of carrying out printing so that the image is placed only in the lower part of paper P, leaving the upper part blank, using a one-component developing agent, the toner charge on the developing roller at the blank portion will increase As a result, a lower density portion will occur equivalent to a single revolution of the developing roller at the leading edge of the image portion. In this case, the design is that the print factor is obtained every 1 scan of photosensitive drum 131 by the laser beam and 'dummy print' is executed at both ends of photosensitive drum 131 when the print factor is lower than a specified value.

By this means, the fluctuation of image density on the same paper can be prevented. Thus, high quality images can be obtained.

When using the image forming apparatus of the present invention as described above, the consumption of developing agent can always be optimised, despite the print factor during normal image formation processing. As a result, it is possible effectively to inhibit reduction of image density and increase of fogging.

What is claimed is:

1. An image forming apparatus comprising:

means for applying a developing agent to a latent image formed on an image carrying body to form a developing agent image on the image carrying body;

means for transferring the developing agent image from the image carrying body onto a printable area of a recording medium;

means for detecting a ratio of area of developing agent image formed on the image carrying body to the printable area of the recording medium;

means responsive to the detecting means for controlling the applying means to apply the developing agent to the image carrying body to forcibly adhere the developing agent onto the image carrying body when the ratio detected by the detecting means is smaller than a specified ratio; and means for removing the developing agent forcibly adhered on the image carrying body by the applying means.

2. The apparatus of claim 1, further comprising transfer controlling means for controlling the transferring to perform no transferring operation to remain the developing agent forcibly adhered on the image carrying body by the applying means.

3. The apparatus of claim 1, wherein the detecting means has calculating means for calculating a print factor expressing a ratio obtained by dividing area of developing agent image formed on the image carrying body by the printable area of the recording medium.

4. The apparatus of claim 1, further comprising means for activating the controlling means to apply the developing agent to the image carrying body immediately after the transferring the developing agent image onto the recording medium by the transferring means.

5. The apparatus of claim 1, wherein the controlling means also including developing control means for controlling the amount of the developing agent to be applied to the image carrying body so that the total of the amount of the developing agent consumed by a first operation, in which the developing agent is applied to form the developing agent image on the image carrying body, and the amount of the developing agent consumed by a second operation, in which the developing agent is applied to forcibly adhere the developing agent onto the image carrying body when the ratio is smaller than the specified ratio, is made equivalent to the specified ratio.

6. The apparatus of claim 1, wherein the controlling means also including means for selectively performing a first mode and a second mode, the first mode executing a normal image forming operation in which the developing agent is applied to the latent image on the image carrying body to form the developing agent image on the image carrying body and the second mode executing the developing agent by adhering the developing agent onto the image carrying body.

7. The apparatus of claim 1, further comprising a process unit detachably mounted in the image forming apparatus and having the image carrying body and the applying means.

8. An image forming apparatus comprising:

means for charging a surface of an image carrying body;

means for selectively irradiating a laser beam on the surface of the image carrying body to form a latent image on the image carrying body, means for applying a developing agent to the latent image to form a developing agent image on the image carrying body;

means for transferring the developing agent image from the image carrying body onto a recording medium;

means for calculating a print factor expressed as $D/D_{ALL}$ in which D represents the number of emission of the laser beam of the irradiating means to form the latent image and $D_{ALL}$ represents the number of printable dots in the area $(W \times L)$ formed by the maximum printable width W and the length L of the recording medium:

means responsive to the calculating means for controlling the applying means to apply the developing agent to the image carrying body to forcibly adhere the developing agent onto the image carrying body when the print factor obtained by the calculating means is smaller than a specified print factor; and means for removing the developing agent forcibly adhered on the image carrying body by the applying means.

9. The apparatus of claim 8, further comprising transfer controlling means for controlling the transferring to perform no transferring operation to remain the developing agent forcibly adhered on the image carrying body by the applying means.

10. The apparatus of claim 8, further comprising means for activating the controlling means to apply the developing agent to the image carrying body immediately after the transferring the developing agent image onto the recording medium by the transferring means.

11. The apparatus of claim 8, wherein the controlling means also including developing control means for controlling the amount of the developing agent to be applied to the image carrying body so that the total of the amount of the developing agent consumed by a first operation, in which the developing agent is applied to form the developing agent image on the image carrying body, and the amount of the developing agent consumed by a second operation, in which the developing agent is applied to forcibly adhere the developing agent onto the image carrying body when the print factor is smaller than the specified print factor, is made equivalent to the specified print factor.

12. The apparatus of claim 8, wherein the controlling means also including means for selectively performing a first mode and a second mode, the first mode executing a normal image forming operation in which the developing agent is applied to the latent image on the image carrying body to form the developing agent image on the image carrying body and the second mode executing a forcibly consuming the developing agent by adhereing the developing agent onto the image carrying body.

13. The apparatus of claim 8, further comprising a process unit detachably mounted in the image forming apparatus and having the image carrying body and the applying means.

* * * * *